(12) United States Patent
Harris et al.

(10) Patent No.: US 7,695,017 B2
(45) Date of Patent: Apr. 13, 2010

(54) STEERING COLUMN ASSEMBLY HAVING A DAMPENER

(75) Inventors: David E. Harris, Birch Run, MI (US); Kurt J. Hilbrandt, Hemlock, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 957 days.

(21) Appl. No.: 11/431,805

(22) Filed: May 10, 2006

(65) Prior Publication Data
US 2006/0261587 A1 Nov. 23, 2006

Related U.S. Application Data

(60) Provisional application No. 60/682,661, filed on May 19, 2005.

(51) Int. Cl.
*B62D 1/18* (2006.01)

(52) U.S. Cl. .......................................... 280/779; 74/493

(58) Field of Classification Search ................. 280/775, 280/779; 74/492, 493
See application file for complete search history.

(56) References Cited

U.S. PATENT DOCUMENTS

| | | | | |
|---|---|---|---|---|
| 1,572,519 | A | * | 2/1926 | Davis ........................... 74/492 |
| 1,820,220 | A | | 8/1931 | Geyer |
| 2,272,900 | A | | 2/1942 | Saurer |
| 2,469,075 | A | | 5/1949 | Paun |
| 3,300,229 | A | | 1/1967 | Kishline |
| 3,662,616 | A | * | 5/1972 | Jouade ......................... 74/492 |
| 4,517,854 | A | | 5/1985 | Kawabata et al. |
| 5,538,282 | A | * | 7/1996 | White et al. ................. 280/779 |
| 5,902,186 | A | | 5/1999 | Gaukel |
| 6,120,046 | A | * | 9/2000 | Daly ............................ 280/90 |
| 6,135,224 | A | * | 10/2000 | Thomas et al. ................ 180/78 |
| 6,547,043 | B2 | | 4/2003 | Card |
| 6,592,148 | B2 | * | 7/2003 | Byers et al. .................. 280/777 |
| 6,733,039 | B2 | * | 5/2004 | Honda et al. ................. 280/780 |
| 6,752,425 | B2 | | 6/2004 | Loh et al. |
| 6,814,374 | B2 | * | 11/2004 | Riefe ........................... 280/779 |
| 6,899,208 | B2 | | 5/2005 | Van Valkenburgh et al. |
| 6,948,741 | B2 | * | 9/2005 | Manwaring et al. .......... 280/775 |
| 7,188,866 | B2 | * | 3/2007 | Ridgway et al. ............. 280/777 |
| 7,261,014 | B2 | * | 8/2007 | Arihara ........................ 74/493 |
| 7,272,989 | B2 | * | 9/2007 | Schuh .......................... 74/492 |
| 7,316,418 | B2 | * | 1/2008 | Goto et al. ................... 280/779 |
| 7,445,241 | B2 | * | 11/2008 | Higashino .................... 280/777 |
| 7,445,242 | B2 | * | 11/2008 | Yamaguchi et al. .......... 280/780 |
| 2005/0167966 | A1 | | 8/2005 | Fischer |

FOREIGN PATENT DOCUMENTS

JP 06156286 A * 6/1994

* cited by examiner

*Primary Examiner*—Paul N Dickson
*Assistant Examiner*—Nicole Verley
(74) *Attorney, Agent, or Firm*—Cantor Colburn LLP

(57) ABSTRACT

A steering column assembly having an outer jacket mounted to a support structure of a vehicle. A steering shaft is movably supported within the jacket for rotation relative to the jacket. A retainer is mounted to the outer jacket and is disposed about the shaft. A dampener is non-rotatably mounted to the retainer and defines a passageway with the shaft extending through the passageway and rotatable within the passageway. The dampener has a portion abutting the shaft and applying a frictional force between the dampener and the shaft against rotation of the shaft within the passageway relative to the dampener.

11 Claims, 3 Drawing Sheets

STEERING COLUMN ASSEMBLY HAVING A DAMPENER

CROSS-REFERENCE TO RELATED APPLICATIONS

The subject patent application claims priority to and all the benefits of U.S. Provisional Patent Application Ser. No. 60/682,661, which was filed on May 19, 2005.

BACKGROUND OF THE INVENTION

1. Field of the Invention

The subject invention relates to a steering column assembly for a vehicle.

2. Description of Related Art

The interaction between steering system components and road conditions during vehicle movement can generate mechanical impulses that excite the steering system. For example, the wheels of the vehicle can be induced to turn, which induces a steering shaft and associated steering wheel to turn. Alternatively, vibration can be generated at one position in the steering system during vehicle movement and can be transmitted through the steering shaft to the steering wheel.

The prior art has recognized the issues of undesirable vibration and movement of the steering shaft and steering wheel and has attempted to isolate these forces. One solution is to incorporate rubber or other vibration absorbing materials into the steering shaft. In other words, the steering shaft is split into one or more sections and the material is disposed between the sections such that rotation of the steering shaft must pass through the material. Examples of this solution can be found in U.S. Pat. Nos. 1,572,519, 2,272,900, and 6,733,039. Another solution incorporates a vibration absorbing material between the steering shaft and an outer jacket. Examples of this solution can be found in U.S. Pat. Nos. 4,517,854, 5,538,282, and 5,902,186.

Although these prior art solutions may be somewhat effective in isolating vibration, these solutions suffer from a number of deficiencies. Also, these known solutions are inadequate for creating a desired frictional force against rotation of the steering shaft.

SUMMARY OF THE INVENTION AND ADVANTAGES

The subject invention includes a steering column assembly for a vehicle having a support structure. The assembly comprises an outer jacket adapted to be mounted to the support structure. A steering shaft is movably supported within the jacket for rotation relative to the jacket. A retainer is fixedly coupled to the outer jacket and disposed about the shaft. A dampener is non-rotatably mounted to the retainer and defines a passageway with the shaft extending through the passageway and rotatable within the passageway. The dampener has a portion abutting the shaft and applying a frictional force between the dampener and the shaft against rotation of the shaft within the passageway relative to the dampener.

A sub-assembly of the invention includes a dampening mechanism comprising the retainer and the dampener. In one embodiment of the invention, the portion of the dampener is further defined as an arcuate engaging surface defining a passageway for abutting the shaft and applying a frictional force between the dampener and the shaft against rotation of the shaft within the passageway relative to the dampener. In this embodiment, a biasing device is mounted to the retainer and is in continuous engagement with the dampener for biasing the arcuate engaging surface into engagement with the shaft. In another embodiment of the invention, the portion is further defined as a plurality of projections secured to an arcuate engaging surface and extending into a passageway defined by the arcuate engaging surface.

The subject invention therefore provides an improved dampener for a steering column assembly for not only isolating vibration but for also imparting a desired frictional force against rotation of the steering shaft.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
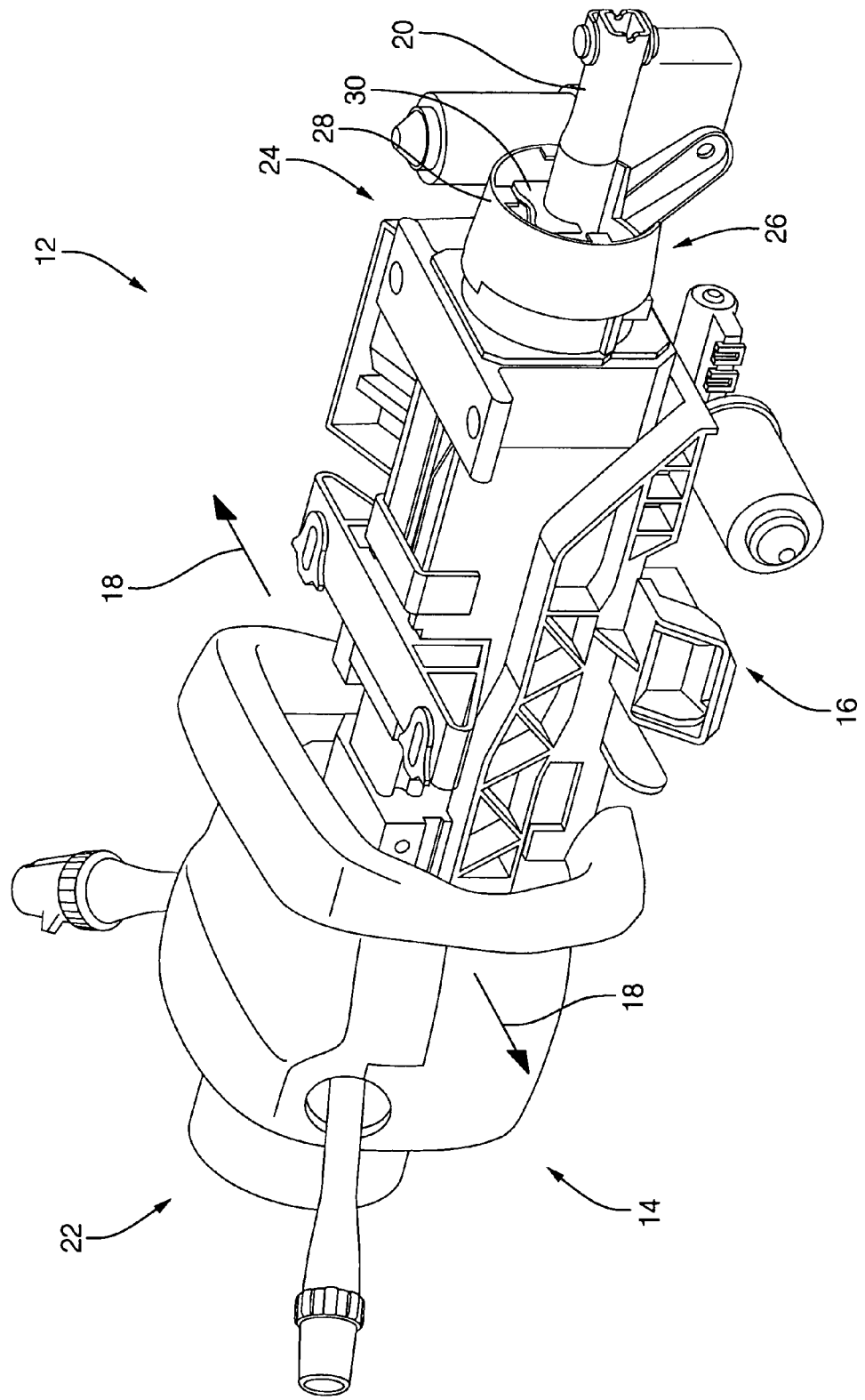
FIG. 1 is a perspective view of a steering column assembly incorporating a dampening mechanism in accordance with the subject invention.

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring now to FIG. 1, a steering column assembly 12 for a vehicle (not shown) is provided. The steering column assembly 12 includes a tilt housing 14 and at least one steering column outer jacket 16. The outer jacket 16 is adapted to be mounted to a support structure (not shown) of the vehicle. The tilt housing 14 and the outer jacket 16 are pivotally engaged with one another. The tilt housing 14 pivots about an axis 18 relative to the outer jacket 16. However, in alternative embodiments of the invention, the steering column assembly 12 could be a raking steering column and/or could be adjustable telescopically.

The steering column assembly 12 at least partially encloses a steering shaft 20, which is movably supported within the outer jacket 16 for rotation relative to the jacket 16. The steering shaft 20 has an annular outer surface and is connected at a first end 22 of the steering column assembly 12 to a steering wheel (not shown). The steering shaft 20 is connected at a second end 24 of the steering column assembly 12 to various steering system components (not shown) such that movement of the steering wheel is transmitted to the wheels of the vehicle.

Figure 2:
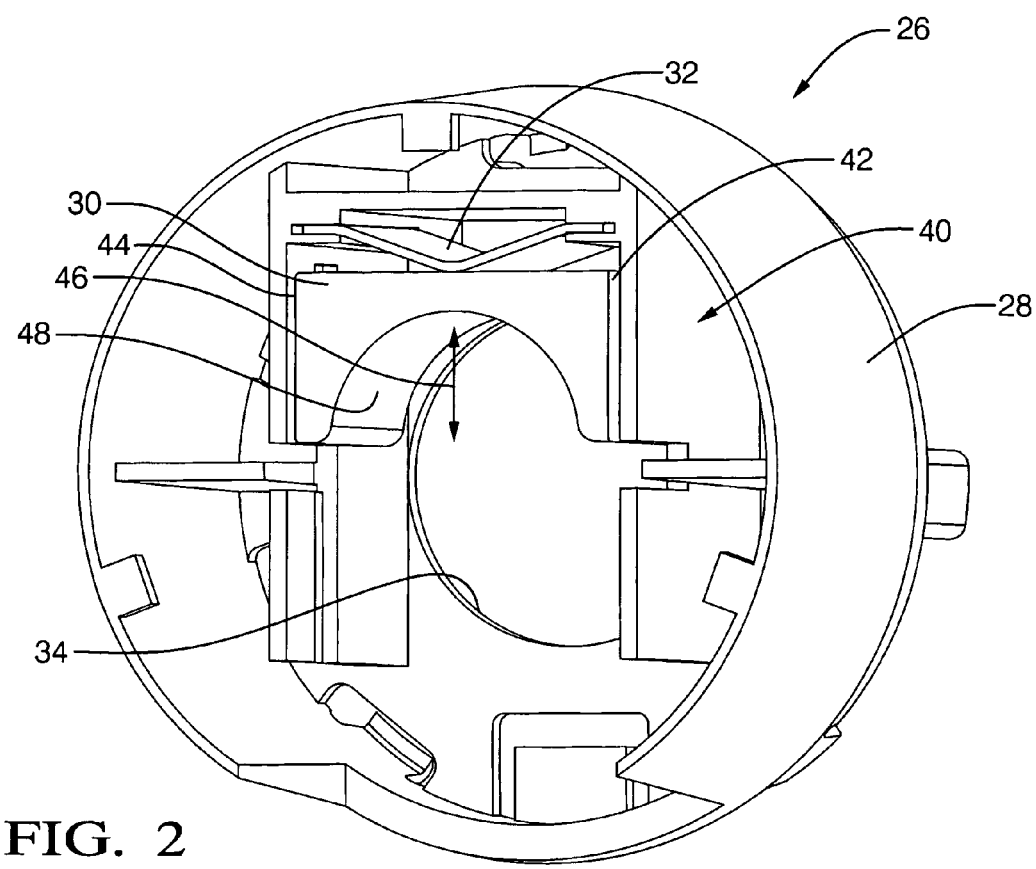
FIG. 2 is a front perspective view of a first embodiment of the dampening mechanism.
Figure 3:
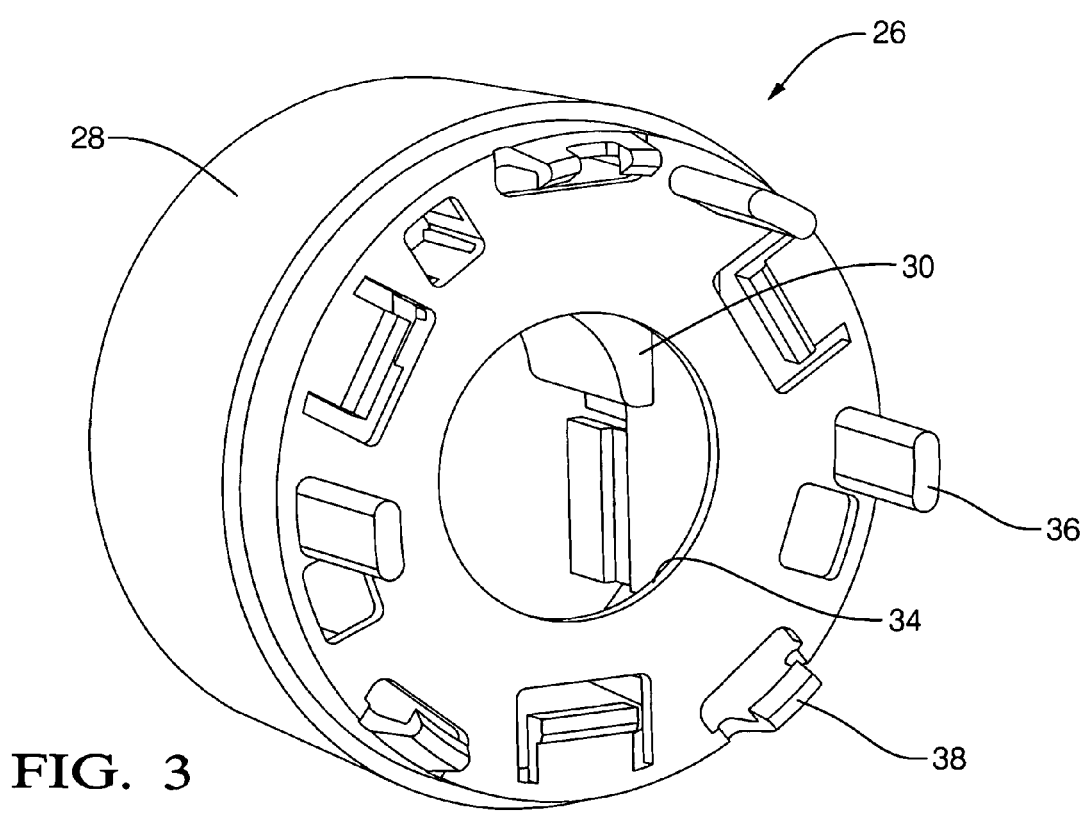
FIG. 3 is a back perspective view of the first embodiment of the dampening mechanism.

Referring now to FIGS. 1-3, a dampening mechanism 26 is disposed at a position along the steering shaft 20 between the first end 22 and the second end 24. As will be discussed in greater detail below, the dampening mechanism 26 applies a substantially controlled amount of resistance to turning the steering shaft 20. In alternative embodiments of the invention (not shown), the dampening mechanism 26 can be disposed at any position in the vehicle's steering system.

In the embodiment of FIGS. 1-3, the dampening mechanism 26 includes a retainer 28, a dampener 30 and a biasing device 32. The retainer 28 includes an aperture 34. The steering shaft 20 extends through the aperture 34. The retainer 28 is fixedly coupled, and is preferably mounted, to the steering column outer jacket 16 and is disposed about the steering shaft 20. The exemplary retainer 28 includes a plurality of aligning posts, such as aligning post 36, and a plurality of snap-fit connectors, such as snap-fit connector 38. The post 36 and snap-fit connector 38 align and engage the retainer 28 and the outer jacket 16 with respect to one another. In alternative embodiments of the invention (not shown), the retainer 28 could be releaseably engaged with the outer jacket 16.

The retainer 28 includes a track 40 for guiding movement of the dampener 30. The dampener 30 includes guides surfaces 42, 44 that slideably engage the track 40 for movement of the dampener 30 along an axis 46. In particular, the dampener 30 is slideably disposed in the track 40 for movement along the axis 46 perpendicular to the aperture 34. The track 40 of the exemplary embodiment of the invention also extends perpendicular to the steering shaft 20 in operation. In alternative embodiments of the invention, the track 40 could extend transverse to the aperture 34 and steering shaft 20. The exemplary retainer 28 is formed from plastic; however, in alternative embodiments of the invention the retainer 28 can be formed from metal.

The dampener 30 is non-rotatably mounted to the retainer 28 and defines a passageway with the steering shaft 20 extending through the passageway and rotatable within the passageway. The dampener 30 has a portion abutting the steering shaft 20 and applying a frictional force between the dampener 30 and the steering shaft 20 against rotation of the steering shaft 20 within the passageway relative to the dampener 30. Preferably, the portion of the dampener 30 continuously abuts the outer surface of the steering shaft 20. Alternatively, the dampener 30 can be movable between a first position wherein the portion contacts the steering shaft 20 and a second position wherein the portion is spaced from the engaging surface 48.

In the embodiment of FIGS. 1-3, the portion of the dampener 30 defines the passageway. In particular, the portion is further defined as an arcuate channel having an arcuate engaging surface 48 defining the passageway. The arcuate engaging surface 48 is complementary in configuration with the outer surface of the steering shaft 20. In other words, the arcuate engaging surface 48 is shaped to correspond to the shape of the steering shaft 20 to enhance the contact area between the steering shaft 20 and the engaging surface 48.

The dampener 30 is made from a material that will result in friction relative to the outer surface of the steering shaft 20. Preferably, the material used to form the dampener 30 will have low wear characteristics. Various materials can be selected depending on the extent of friction desired between the steering shaft 20 and the dampener 30. Also, the surface finish of the steering shaft 20 can be selected in view of the desired extent of friction desired between the steering shaft 20 and the dampener 30.

The biasing device 32 is mounted to the retainer 28 and is in continuous engagement with the dampener 30 to urge or bias the portion of the dampener 30 to the first position. In other words, the biasing device 32 biases the arcuate engaging surface 48 into engagement with the steering shaft 20. The exemplary biasing device 32 is positioned in the track 40. The biasing device 40 preferably moves the dampener 30 linearly along the axis 46 for continuously biasing the portion of the dampener 30 into engagement with the steering shaft 20. The exemplary biasing device 32 is further defined as a spring, such as a wave spring, but, in alternative embodiments of the invention (not shown) could be a coil spring or any other form of a resilient member. The amount of biasing force generated by the biasing device 32 can be selected in view of the desired amount of friction acting on the steering shaft 20.

In alternative embodiments in the invention (not shown) a plurality of dampeners could be engaged with the steering shaft 20. Each of the dampeners could be formed from the same material to generate the same amount of friction acting against movement of the steering shaft 20. Alternatively, one or more of the dampeners could be formed from different material to generate different amounts of friction relative to the steering shaft 20. In other alternative embodiments in the invention (not shown) a plurality of biasing devices can be applied. For example, a single dampener can be biased by more than one biasing device. Alternatively, a single biasing device could be disposed to bias more than one dampener. Also, the plurality of biasing devices can each generate the same amount of biasing force or can generate different amounts of biasing force.

Figure 4:
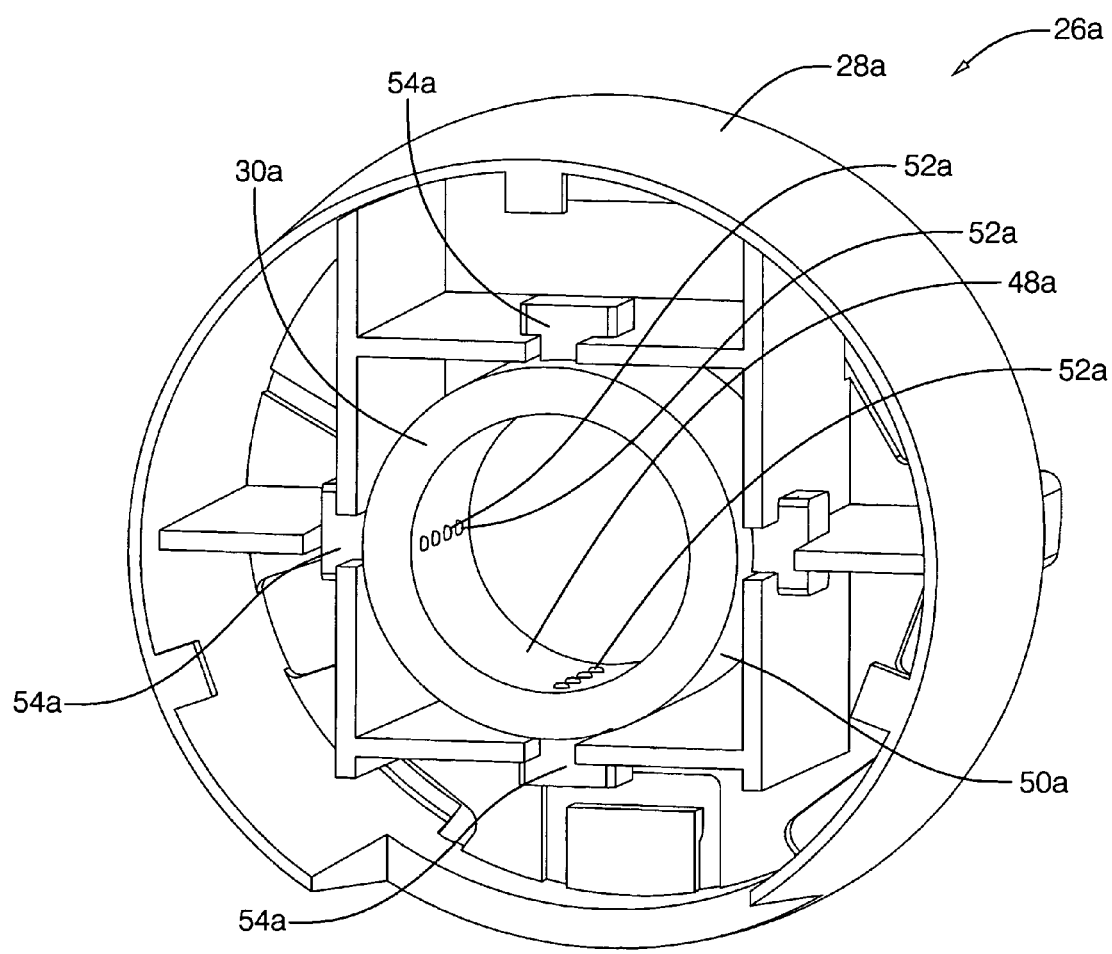
FIG. 4 is a front perspective view of a second embodiment of the dampening mechanism.

Referring now to FIG. 4, a second exemplary embodiment of the invention is shown. This embodiment also includes a dampening mechanism 26a having a retainer 28a and a dampener 30a. As with the first embodiment, the retainer 28a is fixedly coupled to the outer jacket 16 and disposed about the steering shaft 20. The dampener 30a is non-rotatably mounted to the retainer 28a and defines a passageway. The dampener 30a of this embodiment also includes a portion for abutting the shaft 20 and applying a frictional force between the dampener 30a and the shaft 20 against rotation of the shaft 20 within the passageway relative to the dampener 30a.

The dampener 30a of the second embodiment defines a circular ring having an arcuate engaging surface 48a defining the passageway and an exterior surface 50a. The portion of the dampener 30a is further defined as a plurality of projections 52a secured to the arcuate engaging surface 48a and extending into the passageway. The height of the projections 52a can be selected in view of the desired frictional resistance to movement of the steering shaft 20. As shown, the projections 52a are arranged in a plurality of rows. The axial distance between two projections 52a in a row and the angular distance between two projections 52a can be selected in view of the desired frictional resistance. It should be appreciated that the projections 52a may be configured in any suitable manner. A plurality of posts 54a are secured to the exterior surface 50a of the circular ring and engage the retainer 28a for non-rotatably mounting the dampener 30a to the retainer 28a.

As discussed in the background section, it has been observed that some known steering systems demonstrate drag that resists undesired movement of the steering wheel in response to mechanical impulses that excite the steering system. It has further been observed that modification of various components of the steering system can eliminate or reduce drag. The present invention, as demonstrated by the exemplary embodiments, can introduce drag back into a system with modified components wherein drag has been eliminated or undesirably reduced. However, the extent of drag is substantially controlled. In known steering systems exhibiting drag, the extent of drag was variable.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A steering column assembly for a vehicle having a support structure, said assembly comprising:
    an outer jacket adapted to be mounted to the support structure,
    a steering shaft movably supported within said jacket for rotation relative to said jacket,
    a retainer fixedly coupled to said outer jacket and disposed about said shaft said retainer including a track, and
    a dampener non-rotatably mounted to said retainer and defining a passageway with said shaft extending through said passageway and rotatable within said passageway, said dampener including guide surfaces slideable within said track for movement of said dampener along an axis,
    said dampener having a portion abutting said shaft and applying a frictional force between said dampener and said shaft against rotation of said shaft within said passageway relative to said dampener.

2. An assembly as set forth in claim 1 wherein said shaft has an annular outer surface and said dampener has an arcuate engaging surface defining said passageway with said arcuate engaging surface complementary in configuration with said outer surface.

3. An assembly as set forth in claim 2 wherein said portion of said dampener continuously abuts said outer surface of said shaft.

4. An assembly as set forth in claim 1 wherein said portion of said dampener defines said passageway.

5. An assembly as set forth in claim 4 wherein said portion is further defined as an arcuate channel having an arcuate engaging surface defining said passageway.

6. An assembly as set forth in claim 1 further including a biasing device mounted to said retainer and in continuous engagement with said dampener for biasing said portion into engagement with said shaft.

7. An assembly as set forth in claim 6 wherein said biasing device moves said dampener linearly along said axis for continuously biasing said portion into engagement with said shaft.

8. An assembly as set forth in claim 7 wherein said biasing device is further defined as a spring.

9. A dampening mechanism for a steering column assembly having a steering shaft rotatably supported within an outer jacket, said mechanism comprising:
    a retainer adapted to be fixedly coupled to the outer jacket and disposed about the shaft, said retainer including a track,
    a dampener non-rotatably mounted to said retainer and having an arcuate engaging surface defining a passageway for abutting the shaft and applying a frictional force between said dampener and the shaft against rotation of the shaft within said passageway relative to said dampener, said dampener including guide surfaces slideable within said track for movement of said dampener along an axis, and
    a biasing device mounted to said retainer and in continuous engagement with said dampener for biasing said arcuate engaging surface into engagement with the shaft.

10. A dampening mechanism as set forth in claim 9 wherein said biasing device moves said dampener linearly along said axis for continuously biasing said arcuate engaging surface into engagement with the shaft.

11. A dampening mechanism as set forth in claim 9 wherein said biasing device is further defined as a spring.

* * * * *